United States Patent [19]
Johnson

[11] Patent Number: 5,222,344
[45] Date of Patent: Jun. 29, 1993

[54] POLE STRUCTURE

[76] Inventor: David W. Johnson, 1884 Sunset Blvd., San Diego, Calif. 92103

[21] Appl. No.: 715,908

[22] Filed: Jun. 14, 1991

Related U.S. Application Data

[63] Continuation-in-part of Ser. No. 541,547, Jun. 21, 1990, Pat. No. 5,024,036.

[51] Int. Cl.⁵ .............................................. E04C 3/30
[52] U.S. Cl. .................................... 52/728; 52/724; 52/731.3
[58] Field of Search .................. 52/731, 727, 724, 728

[56] References Cited

U.S. PATENT DOCUMENTS

| | | | |
|---|---|---|---|
| 3,013,584 | 12/1961 | Reed | 57/727 |
| 3,829,999 | 8/1974 | Bernstein | 52/648 |
| 3,974,611 | 8/1976 | Satterthwaite | 52/648 |
| 4,254,987 | 3/1981 | Leonards | 52/648 |
| 4,448,832 | 5/1984 | Kidwell | 52/648 |
| 5,028,357 | 7/1991 | Bardo | 52/239 |

Primary Examiner—Henry E. Raduazo
Attorney, Agent, or Firm—Ralph S. Branscomb

[57] ABSTRACT

A pole for supporting utility lines and the like is made of pultruded composites. In one embodiment, an interior lattice of composite members forms an elongated open-celled beam which is enclosed in a preferably composite outer skin. In another embodiment pole side panels are pultruded to define interlocking edges so they can be laid parallel to define an enclosure with the edges interfitting.

7 Claims, 2 Drawing Sheets

POLE STRUCTURE

This invention is a continuation in part of U.S. Pat. No. 5,024,036 to issue Jun. 18, 1991 on an INTERLOCKING SUPPORT STRUCTURES, filed Jun. 21, 1990 having Ser. No. 541,547.

BACKGROUND OF THE INVENTION

The parent patent covered several structural features, and structured themselves made using interlocking pultruded composites. The inventor has several other patents along the same lines, the most similar to this invention being U.S. Pat. No. 4,825,620 issued May 2, 1989 for a STRUCTURAL SUPPORT OF INTERLOCKING LATTICE CONSTRUCTION. Less similar structures are shown in U.S. Pat. Nos. 4,715,513 and 4,809,146 and U.S. Pat. No. 4,991,726 issued Feb. 12, 1991 on a SUPPORT STAND.

This application is one in a series of applications made on different constructions using pultruded composites which have progressed from the beginning more and more toward large structural units. It is applicant's belief that pultruded composites represent an under developed field of engineering and there are many instances in which steel could be replaced by composites as in some applications composites have qualities superior to those of steel, where weight, corrosion resistance, and insulative properties are required to be enhanced.

SUMMARY OF THE INVENTION

The instant invention comes in two embodiments, each of which is adapted for use as an electrical distribution pole or similar elongated structure. The first embodiment discloses an elongated lattice similar to applicant's U.S. Pat. No. 4,825,620. However, the open-celled beam is wrapped with a solid composite skin which could also be pultruded to provide it rigidity, weatherproofness, and for more visual appeal. In the second embodiment, elongated pultruded panels are made with interfitting edges so that they can be assembled to form an enclosure, for example an octagonal enclosure, with the panels then being epoxied to one another.

DETAILED DESCRIPTION OF THE PREFERRED EMBODIMENTS

Figure 1:
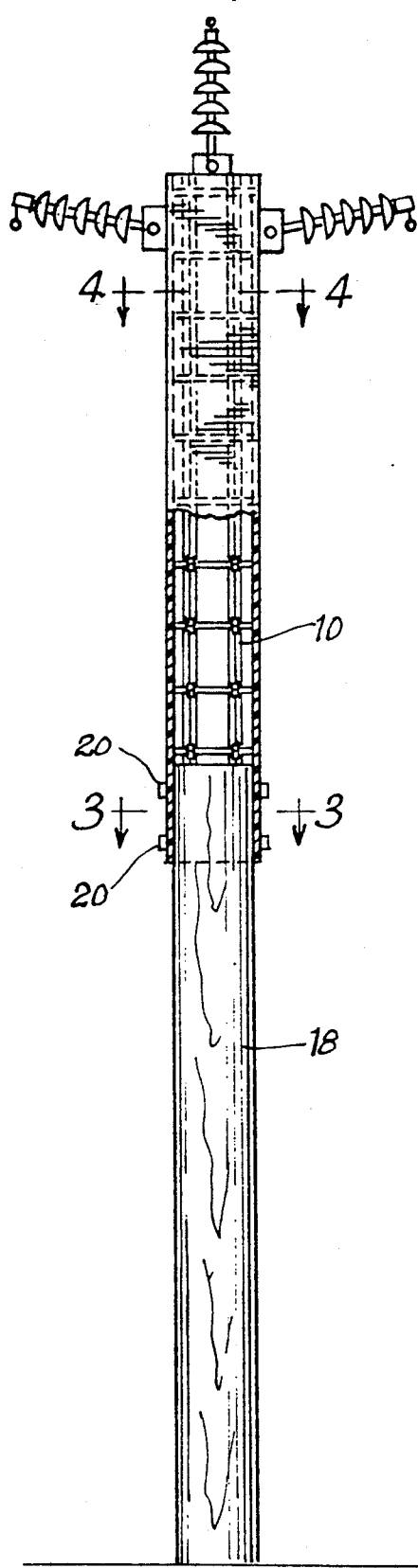
FIG. 1 is a front elevation view with portions of the outer skin cut away to illustrate a sleeved lattice beam.
Figure 4:
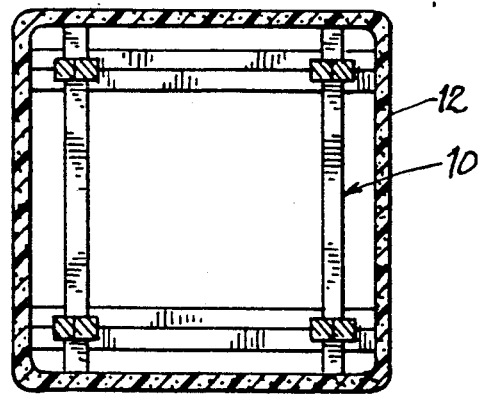
FIG. 4 is a section taken along lines 4—4 of FIG. 1.
Figure 3:
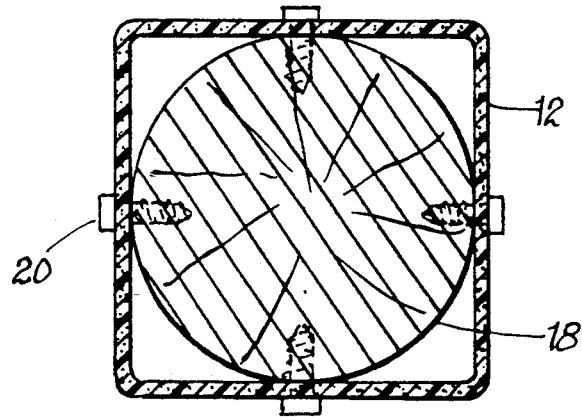
FIG. 3 is a section taken through lines 3—3 of FIG. 1.
Figure 2:
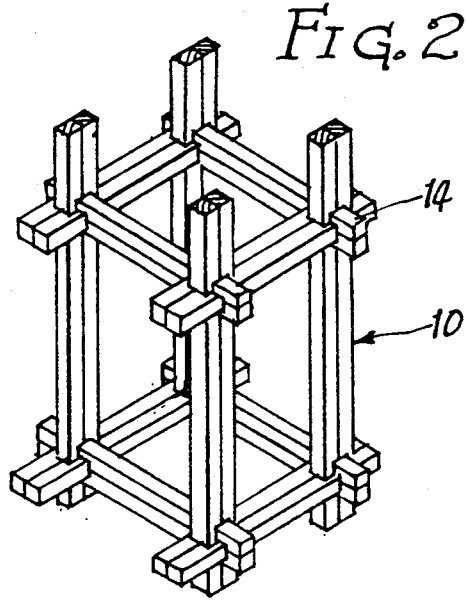
FIG. 2 is a perspective of a portion of the lattice beam.

The heart of the pole comprising the first embodiment is shown in FIG. 2 and is a cellular beam 10 in the form of a lattice with parallelopiped cells. FIG. 2 is illustrative of one way of making these beams, but it is not intended to be limiting insofar as its exact shape is concerned. Construction of the interlocking joints 14 of the structure is detailed in the above referenced patents, particularly U.S. Pat. No. 4,825,620, and will not be described herein, but is incorporated herein by reference.

Surrounding the lattice beam or cellular beam 10 is a solid and preferably rigid skin which could also be made as a pultruded composite. The skin would ordinarily be epoxied to the butt ends 16 of the lattice beam for further rigidity.

In the embodiment shown, the skin sleeves over the top of the post 18 and fastened with screws 20 for use as a power pole. However, the cell structure and skin could pass all the way to the ground, and could be used for anything and would not be limited to use as a utility pole.

This construction is advantageous over wood in that it is completely impervious to decay and rot and would last indefinitely. It is superior to steel in that it is substantially nonconductive. It could also be made more lightweight than wood or steel.

Figure 5:
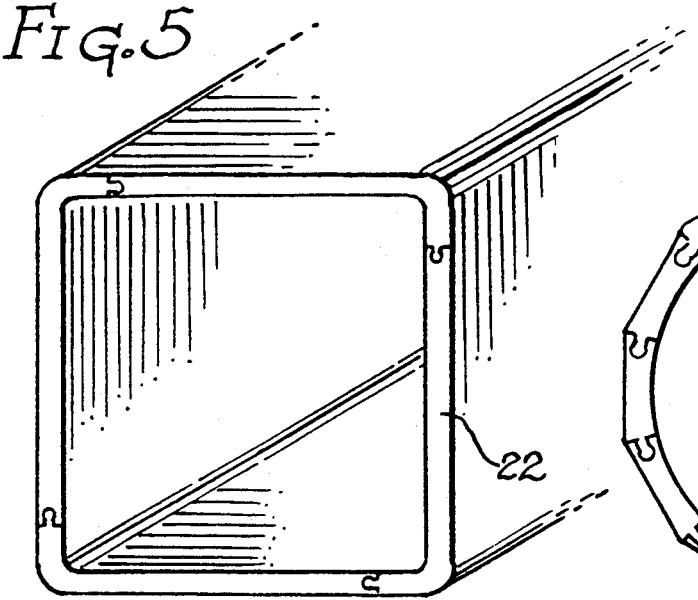
FIG. 5 is a fragmentary perspective view of a portion of a beam of the type of the second embodiment.

The other embodiment is shown in the remaining Figures and comprises a hollow post or beam with side walls which are pultruded composites. This takes advantage of the higher moment of inertia around the center of the beam for greatly increased strength, with only one die being needed to produce all of the sides, as shown in FIG. 5. This would have obvious utility as a power pole, telephone pole, light pole, etc. for the reasons mentioned in the discussion of the first embodiment.

Figure 6:
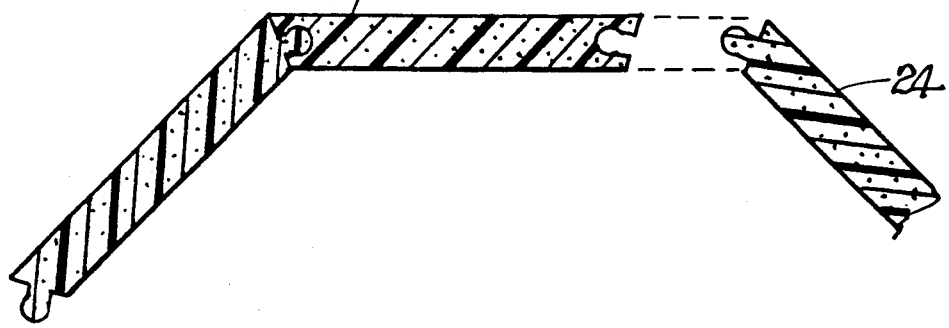
FIG. 6 illustrates diagrammatically a type of panel beam having male and female types; and, FIG. 7 is a diagrammatic view of another example of the second embodiment.

Another example is shown in FIG. 6, in which the panels 24 and 26 are male and female, so two dies would be required. The panels when assembled create an 8-sided pole.

Figure 7:
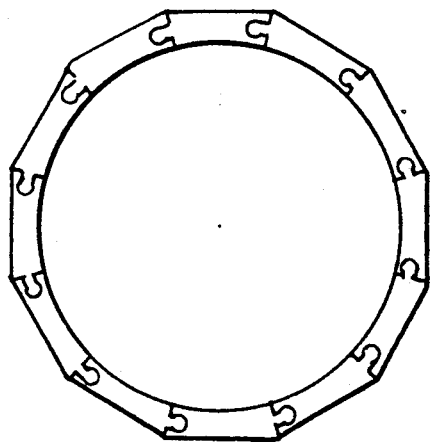

FIG. 7 represents another variation for creating a 12-sided pole. Basically, any number of side panels greater than two would work if properly designed. A positively interlocking enclosure could be made and it is intended that the panels be epoxied together.

Clearly, these embodiments with their variations could be used in hundreds or thousands of applications. In locations where corrosion, humidity, air pollution and other elements attack steel and wood, the composite pultrusion pole would be ideal.

It is hereby claimed:

1. A pole structure comprising:
   (a) a plurality of elongated elements;
   (b) some of said elongated elements being longitudinally extended elements extended in a longitudinal direction and others of said elongated elements being transversely extended beams extending transversely of said longitudinal direction;
   (c) said longitudinally extended elements and said transversely extended elements defining a plurality of interlocking joints at which said elements intersect and interlock such that said cellular beam is rigidified and maintained integral; and,
   (d) a rigid skin encircling said beam to rigidify said beam.

2. Structure according to claim 1 wherein said cellular beam is defined as a linear sequence of integral open cells defined by said elements and the joints formed by said elements such that said elongated elements span a plurality of cells and a substantial portion of the length of said cellular beam while interlocking at said joints and said cells substantially define open-faced parallelopipeds.

3. Structure according to claim 2 wherein said transverse elements have laterally extended ends projecting outwardly beyond said longitudinal beams to possibilitate the formation of interlocking notches at said joints and said skin is flush against said laterally extended ends and bonded thereto.

4. Structure according to claim 1 and including a post and said cellular beam is mounted to one end of said post with said skin extending beyond said cellular beam and being sleeved over said post to form a coherent utility pole.

5. Structure according to claim 1 wherein said elongated cellular beam is made substantially in its entirety of composite construction, forming a substantially completely composite interlocked lattice structure internally of said skin.

6. Structure according to claim 5 wherein said sin as well as said beam is of composite construction and substantially comprises a single composite unit.

7. Structure according to claim 1 wherein said skin comprises a single pultruded tubular composite.

* * * * *